July 27, 1965   J. M. COATES   3,197,352
METHOD OF FORMING RIGID PANELS AND RIGID PANEL PRODUCTS
Filed Aug. 17, 1962

INVENTOR.
JAMES M. COATES
BY *Elliott & Pastoriza*
ATTORNEYS

United States Patent Office 3,197,352
Patented July 27, 1965

3,197,352
METHOD OF FORMING RIGID PANELS AND RIGID PANEL PRODUCTS
James M. Coates, 7141 Birdview Drive, Malibu, Calif.
Filed Aug. 17, 1962, Ser. No. 217,565
1 Claim. (Cl. 156—242)

This invention relates generally to construction materials and more particularly to a novel method of forming panel structures. The invention also includes the panel structures themselves as products.

Panel structures formed from foams and similar plastic-like materials are well known in the art and have the advantage of relatively high strength to weight ratios. It is desirable that such panel structures be impervious to liquids, capable of withstanding severe weather conditions, be relatively fire resistant, and yet easy to manipulate, form, cut, and so forth.

In present day methods of forming panels, the foam is usually formed in molds, the foam itself being formed in place and limited in dimensions to that of the mold. These systems thus require molds including side and end walls so that the foam is properly confined. Because the foam is formed in place, however, its density and thickness is not accurately predictable. Further, heat and pressure under careful control are required to complete the panel structure.

With the foregoing in mind, a first object of this invention is to provide a vastly improved rigid panel type product having all the desirable characteristics set forth heretofore.

Another important object is to provide a novel method of forming such product.

Briefly, these and many other objects and advantages of this invention are attained by providing a novel product combination comprising a pre-cast foam material such as polyurethane sandwiched between wall linings including a reinforcing matting. This matting preferably comprises a glass fiber mat or cloth such as "Fiberglas," for example, and is impregnated with a thermo-setting resin such as polyester or epoxy resin to provide an extremely durable, impervious, and hard wall lining or surface.

In accordance with the preferred method for making the panel structure, two identical molds are employed. The first mold has applied to its surface a gel-coat for receiving a reinforcing coat forming one of the wall linings such as the glass fiber matting impregnated with a thermo-setting resin. The foam is then placed over this reinforcing coat. The foam itself is pre-cast so that its thickness and density are already known and complicated mold structures are unnecessary.

The second mold also comprises a flat mold surface co-extensive with the surface of the first mold. On this second mold surface there is provided a gel-coat for receiving glass or reinforcing matting impregnated with a thermo-setting resin. The second mold is then placed in opposing relationship to the first mold and the molds urged towards each other to define the panel therebetween. Only minimal heat and pressure are necessary to cure the thermo-setting resins after which the molds may be removed.

A better understanding of the invention will be had by now referring to the accompanying drawings illustrating schematically the various steps of the method, wherein.

Figure 1:
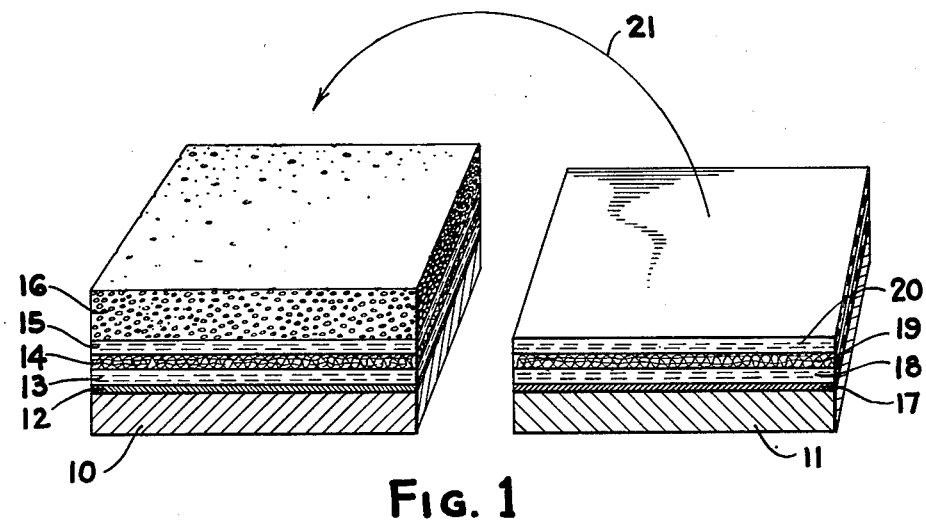
FIGURE 1 is a perspective view illustrating the principal apparatus and materials employed in carrying out the method.

Referring first to FIGURE 1, there are illustrated first and second molds 10 and 11 which are co-extensive in dimension and each provided with flat non-porous smooth upper surfaces. Towards this end, the molds may be formed from metal such as steel. However, any smooth impervious or non-porous surface may be used such as glass, plastic, sealed woods, concrete, plaster, and so forth. In accordance with the method there is provided on the first mold 10 a mold parting agent 12 such as paste wax or any other release agent. After the parting agent has been properly spread over the surface, a thin coat of a thermo-setting resin is applied over the surface and permitted to gel to a tacky consistency. This coating may constitute a polyester or epoxy type resin. After gelling, a coat of glass fiber matting 14 is positioned on the gelled surface of the gel coat and impregnated with a laminating resin 15 which may also comprise a polyester. While this latter coat is still in a gel state, pre-cast solid state polyurethane foam 16 is positioned thereover. The thickness of the panel is essentially determined by the thickness of the pre-cast polyurethane foam. The pre-cast foam itself may be flexible to conform to curved mold surfaces.

The second flat mold surface for the mold 11 is similarly coated with a parting agent 17 on top of which there is applied a gel coat 18 of thermo-setting resin such as polyester. A layer of glass fiber reinforcing material 19 together with a laminating resin 20 corresponding to the coats 14 and 15 is provided. The second mold 11 may then be positioned in opposing relationship to the first mold 10 as indicated by the arrow 21.

Figure 2:
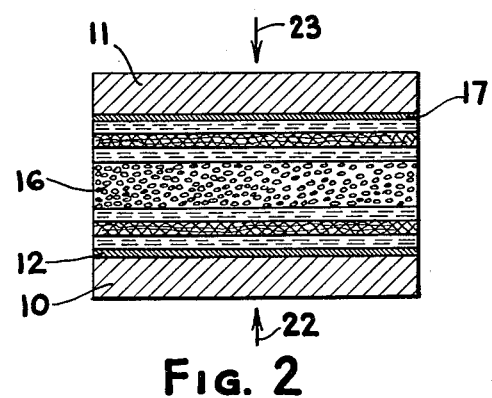
FIGURE 2 illustrates the relative positions of the structure of FIGURE 1 during an intermediate step in the method; and, FIGURE 3 illustrates a completed rigid panel structure.

With reference to FIGURE 2, the molds 10 and 11 are urged towards each other as indicated by the arrows 22 and 23, respectively. The foam 16 is thus sandwiched between the various layers and complete curing of these layers under minimal heat and pressure will occur.

Figure 3:
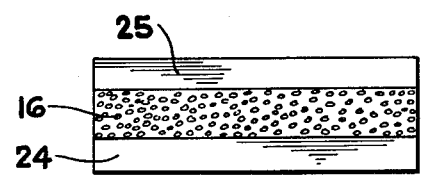

In the final step of the method, the molds 10 and 11 are removed, this operation being readily carried out as a consequence of the parting agent employed. There is then left the completed rigid panel as illustrated in FIGURE 3. As shown, the various glass matting coatings have merged into single rigid wall linings 24 and 25 sandwiching the foam 16 therebetween.

It is possible to use only one mold surface although not as convenient. Thus, after the layers have been built up as shown on the mold 10 of FIGURE 1, the mold may be separated out and then layers as shown at 17, 18, 19, and 20 on the mold 11 formed on the mold 10. The free surface of the foam 16 is then pressed onto these latter layers.

It should also be understood that colors may be incorporated in the gel coats to provide colored panels.

From the foregoing description, it will thus be evident that the present invention has provided a greatly improved construction panel and novel method of forming the panel.

What is claimed is:

A method of forming a rigid flat panel for use in construction work, comprising the steps of: applying a thin coat of a mold parting agent to a flat non-porous first mold surface; applying a thermosetting resin to provide a first gel coat; permitting said gel coat to partially gel to a tacky consistency; overlying said first gel coat with reinforcing material; wetting said reinforcing material with a thermo-setting resin to form a reinforcing coat; applying pre-cast solid state polyurethane foam to said reinforcing coat while it is still wet; applying a thin coat of a mold parting agent to a flat non-porous second mold surface at least co-extensive in area with said first mold surface; applying a thermo-setting resin to provide a second gel coat; permitting said second gel coat to partially gel to a tacky consistency; overlying said second gel coat with reinforcing material; wetting said reinforcing material with a thermosetting resin to form a reinforcing coat similar to said first mentioned reinforcing coat; placing said second mold surface in opposing relationship to said first mold surface while it is still wet to sandwich said solid state polyurethane foam therebetween; urging said mold surfaces towards each other under a given pressure; applying heat while said pressure is applied; and removing said molds whereby a panel having both opposite flat surfaces formed with reinforcing material in place is provided.

References Cited by the Examiner

UNITED STATES PATENTS

| | | | |
|---|---|---|---|
| 2,642,920 | 6/53 | Simon et al. | 161—150 |
| 2,850,890 | 9/58 | Rubenstein | 161—161 |
| 2,875,117 | 2/59 | Potchen | 161—161 X |
| 2,951,001 | 8/60 | Rubenstein | 156—245 |
| 2,972,559 | 2/61 | Allen et al. | 156—322 |
| 3,041,220 | 6/62 | Martin et al. | 154—45.9 |
| 3,043,730 | 7/62 | Adie | 154—45.9 |
| 3,047,449 | 7/62 | Coble | 156—79 |

ALEXANDER WYMAN, *Primary Examiner.*

MORRIS SUSSMAN, EARL M. BERGERT,
*Examiners.*